United States Patent
Chen

(10) Patent No.: US 7,050,298 B2
(45) Date of Patent: May 23, 2006

(54) MOUNTING APPARATUS FOR DATA STORAGE DEVICES

(75) Inventor: Yun Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/862,153

(22) Filed: Jun. 3, 2004

(65) Prior Publication Data

US 2004/0246674 A1    Dec. 9, 2004

(30) Foreign Application Priority Data

Jun. 3, 2003    (TW) .............................. 92210226 U

(51) Int. Cl.
*G06F 1/16*    (2006.01)
(52) U.S. Cl. .................. 361/685; 312/223.2; 312/263; 312/265.5
(58) Field of Classification Search ................ 361/679, 361/683, 684, 685, 686; 312/263, 265.5, 312/223.2
See application file for complete search history.

(56) References Cited

U.S. PATENT DOCUMENTS

| | | | | |
|---|---|---|---|---|
| 5,940,265 A | * | 8/1999 | Ho ............................. | 361/685 |
| 5,995,364 A | * | 11/1999 | McAnally et al. ........... | 361/685 |
| 6,362,955 B1 | * | 3/2002 | Felcman et al. ............ | 361/683 |
| 6,538,879 B1 | * | 3/2003 | Jiang .......................... | 361/683 |
| 6,614,654 B1 | * | 9/2003 | Liu et al. .................... | 361/685 |
| 6,654,240 B1 | * | 11/2003 | Tseng et al. ................ | 361/685 |
| 6,798,653 B1 | * | 9/2004 | Chen et al. ................. | 361/685 |
| 6,801,427 B1 | * | 10/2004 | Gan et al. ................... | 361/685 |
| 6,862,174 B1 | * | 3/2005 | Chien et al. ............... | 361/685 |
| 2003/0038566 A1 | * | 2/2003 | Qiu ........................ | 312/223.2 |

FOREIGN PATENT DOCUMENTS

| | | |
|---|---|---|
| TW | 146513 | 11/1990 |
| TW | 190919 | 9/1992 |

* cited by examiner

*Primary Examiner*—Anatoly Vortman
*Assistant Examiner*—Zachary M. Pape
(74) *Attorney, Agent, or Firm*—Wei Te Chung

(57) ABSTRACT

A mounting apparatus includes a mounting frame (60) secured to a chassis (10) and receiving a data storage device (100) therein. The data storage device includes a pair of posts (102) on each of opposite sides thereof. The mounting frame includes a bottom wall (62) and two sidewalls (64, 66). A pair of channels (80) is defined in the sidewalls respectively for receiving the posts of the data storage device. Each of the channels forms a stop end (81) and an inwardly projecting resilient member (82) spacing from the stop end. The resilient member of one of the channels has a slanted portion and a vertical portion. When a corresponding post of the data storage device rides over the slanted portion, the vertical portion stops the post from escaping from the channel. Thus the data storage device is retained in the mounting frame.

2 Claims, 6 Drawing Sheets

MOUNTING APPARATUS FOR DATA STORAGE DEVICES

BACKGROUND OF THE INVENTION

1. Field of the Invention

The present invention relates generally to apparatuses for mounting computer components within a computer enclosure, and more particularly to a mounting apparatus for easily installing and removing data storage devices such as disk drives.

2. Related Art

A number of different means and devices are used to mount data storage devices, such as disk drives or CD-ROMs, to drive brackets of computer enclosures. One widely used means is to simply screw the data storage device directly to a drive bracket. A significant drawback of this means is that the insertion and removal of screws is time consuming and cumbersome, particularly due to workspace restrictions and accessibility limitations existing within a typical computer chassis. More recent developments facilitate installation and removal of data storage devices by other means. These include the use of guide rail type devices, such as those described below.

Taiwan Patent Publication No. 190919 discloses a mounting apparatus employing sliding rails for mounting data storage devices. A pair of sliding slots is defined in opposite sides of a drive bracket respectively. A pair of sliding rails is attached to opposite sides of a data storage device respectively, corresponding to the sliding slots. However, the sliding rails are attached to the drive bracket with screws. Insertion and removal of the screws is still time consuming and cumbersome.

Taiwan Patent Publication No. 146513 discloses another kind of mounting apparatus that needs no tools when disassembled. A pair of slide members is attached to opposite sides of a data storage device. The front part of the slide member comprises a locking plate. A locking hole is defined in a drive bracket, the locking hole corresponding to the locking plate. The locking plate engages in the locking hole to secure the data storage device to the drive bracket. In disassembly, the locking plate is released, and the data storage device is slid out from the drive bracket. However, when the data storage device needs to be maintained or replaced, the slide members have to be unscrewed therefrom. This operation is time consuming and cumbersome.

Thus an improved mounting apparatus for data storage devices which overcomes the above-mentioned problems is desired.

SUMMARY OF THE INVENTION

Accordingly, an object of the present invention is to provide a mounting apparatus for data storage devices which enables easy installation and removal of data storage devices thereinto and therefrom.

To achieve the above-mentioned object, a mounting apparatus of the present invention includes a mounting frame secured to a chassis and receiving a data storage device therein. The data storage device includes a pair of posts on each of opposite sides thereof. The mounting frame includes a bottom wall and two sidewalls. A pair of channels is defined in the sidewalls respectively for receiving the posts of the data storage device. Each of the channels forms a stop end and an inwardly projecting resilient member spacing from the stop end. The resilient member of one of the channels has a slanted portion and a vertical portion. When a corresponding post of the data storage device rides over the slanted portion, the vertical portion stops the post from escaping from the channel. Thus the data storage device is retained in the mounting frame.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
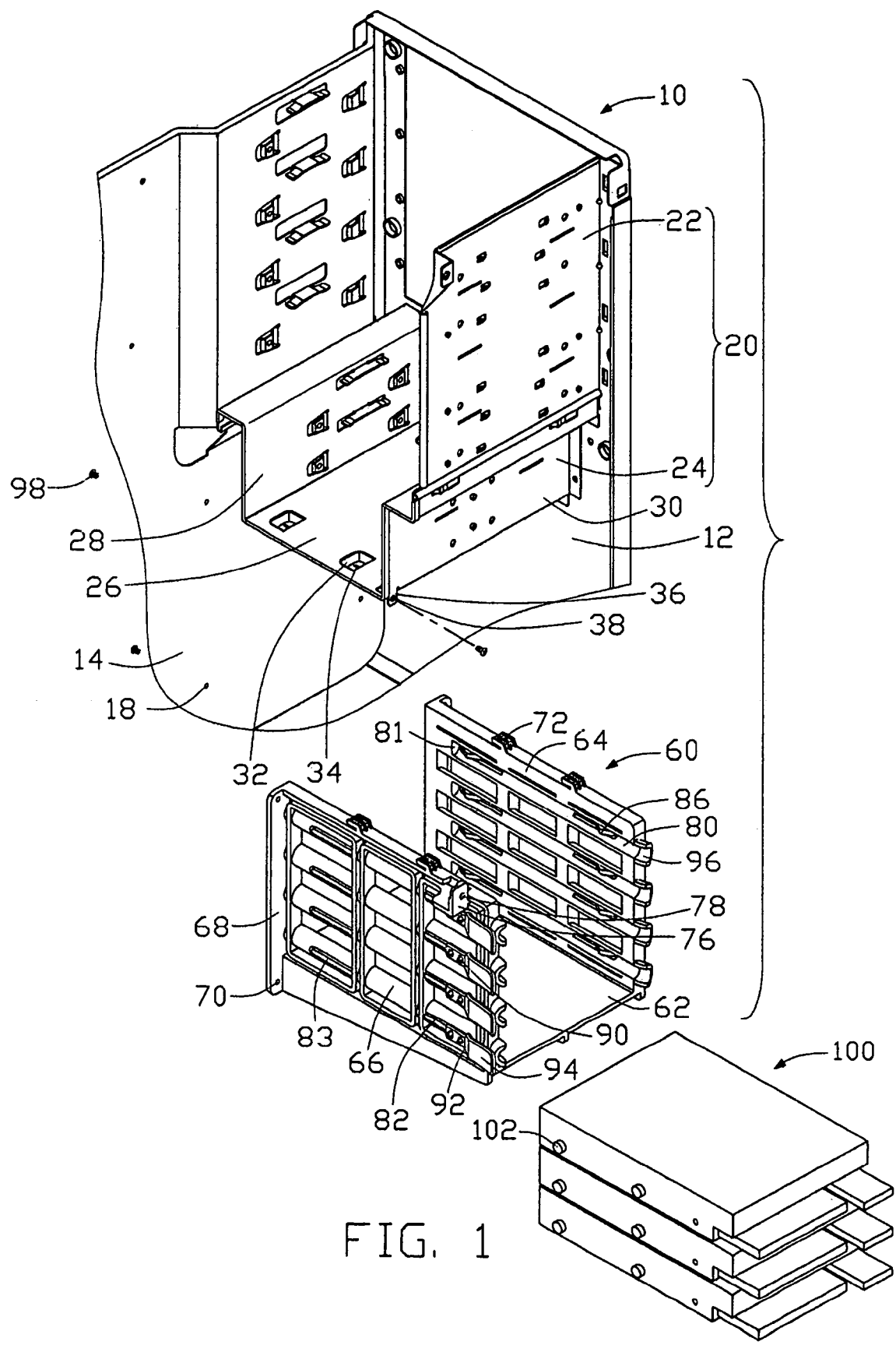
FIG. 1 is an exploded, isometric view of a mounting apparatus for data storage devices in accordance with a preferred embodiment of the present invention, together with a plurality of data storage devices.

Referring to FIG. 1, a mounting apparatus in accordance with the preferred embodiment of the present invention comprises a chassis 10 and a mounting frame 60 secured in the chassis 10. A plurality of data storage devices 100 is engagingly received in the mounting frame 60. In the preferred embodiment, each data storage device 100 comprises a pair of horizontally aligned posts 102 on each of opposite lateral sides thereof. The posts 102 serve as sliders sliding within the mounting frame 60. Alternatively, the posts 102 may be replaced by tabs, tenons, or any other suitable protrusions or projections that extend from or are attached to the opposite lateral sides of the data storage device 100.

The chassis 10 comprises a front panel 12, a side panel 14 extending rearwardly from a lateral side of the front panel 12, and a drive bracket assembly 20 secured to the front panel 12 and side panel 14. The side panel 14 defines a plurality of spaced first locking holes 18 therein.

The drive bracket assembly 20 comprises an upper, large, first drive bracket 22 for CD-ROM drives combined with a lower, small, second drive bracket 24 for floppy disk drives. The second drive bracket 24 comprises a bottom plate 26, and a pair of lateral plates 28, 30 extending upwardly from opposite lateral sides of the bottom plate 26. The bottom plate 26 comprises a plurality of spaced, downwardly punched catches 32. Each catch 32 defines a slot 34 in a bottom thereof, and an opening (not labeled) facing the lateral plate 30. A first tab 36 extends downwardly from a rearmost portion of the lateral plate 30. The first tab 36 defines a second locking hole 38 therein.

Figure 2:
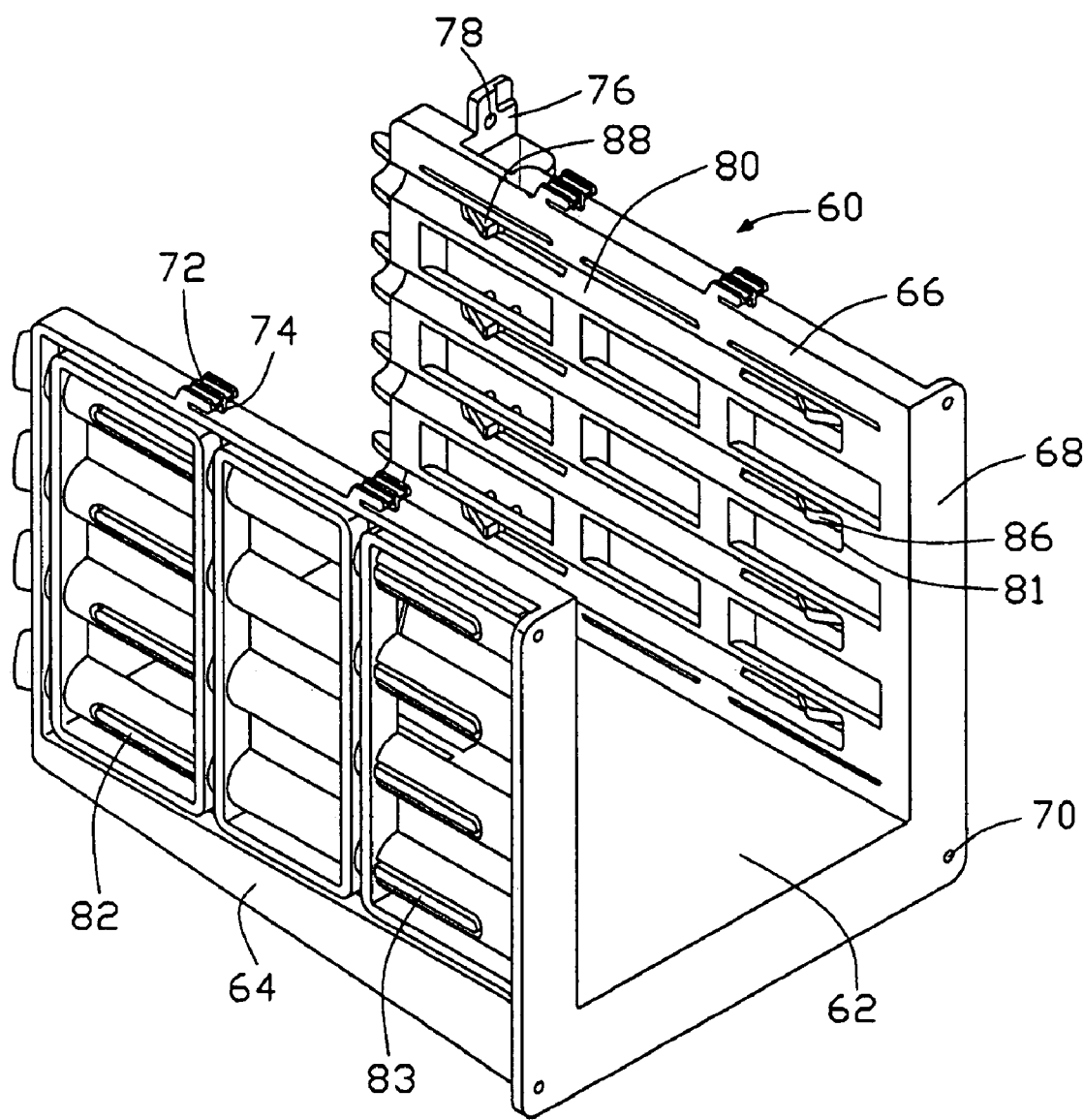
FIG. 2 is an enlarged, isometric view of a mounting frame of the mounting apparatus of FIG. 1, but viewed from another aspect.
Figure 3:
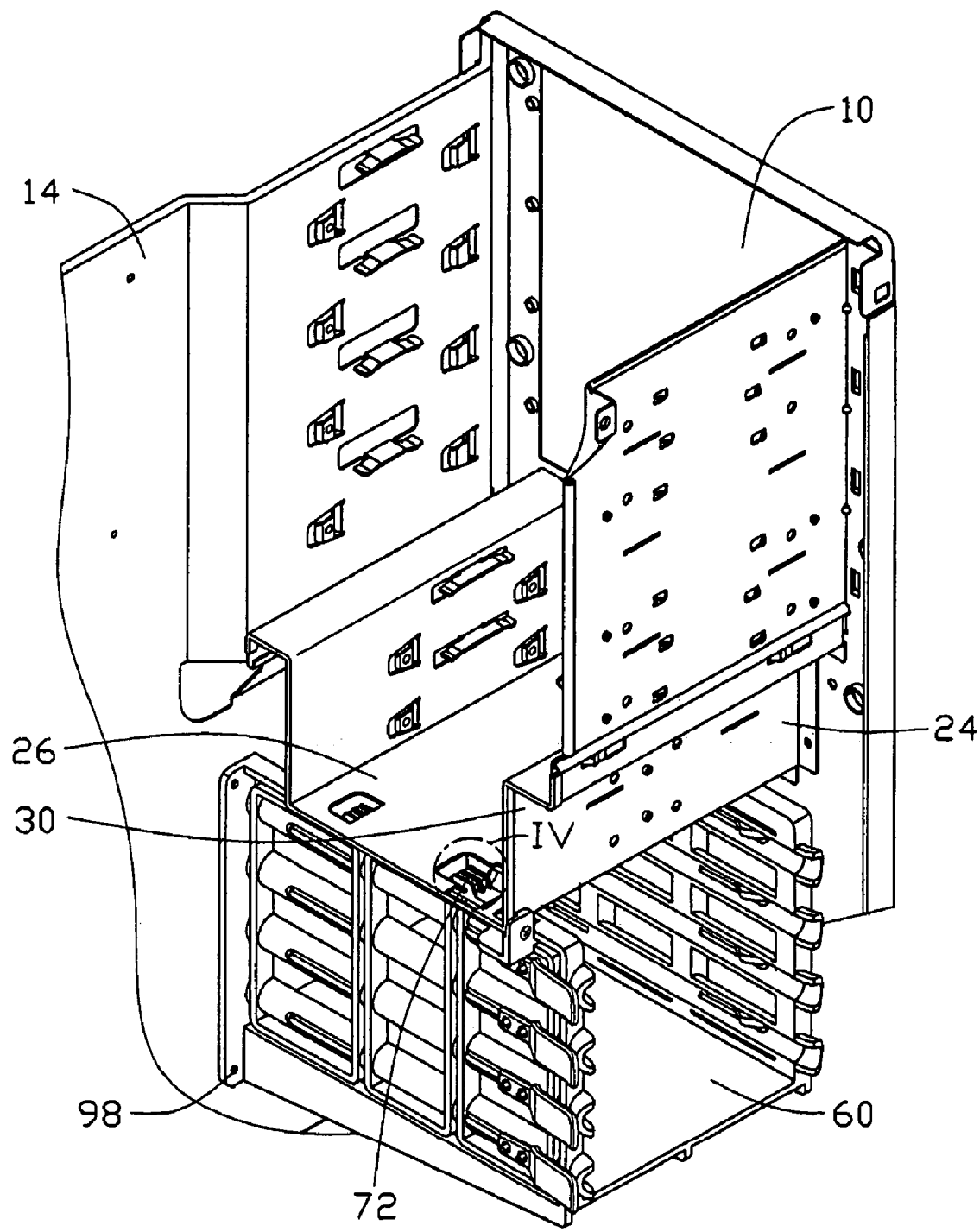
FIG. 3 is an assembled view of the mounting apparatus of FIG. 1.
Figure 4:
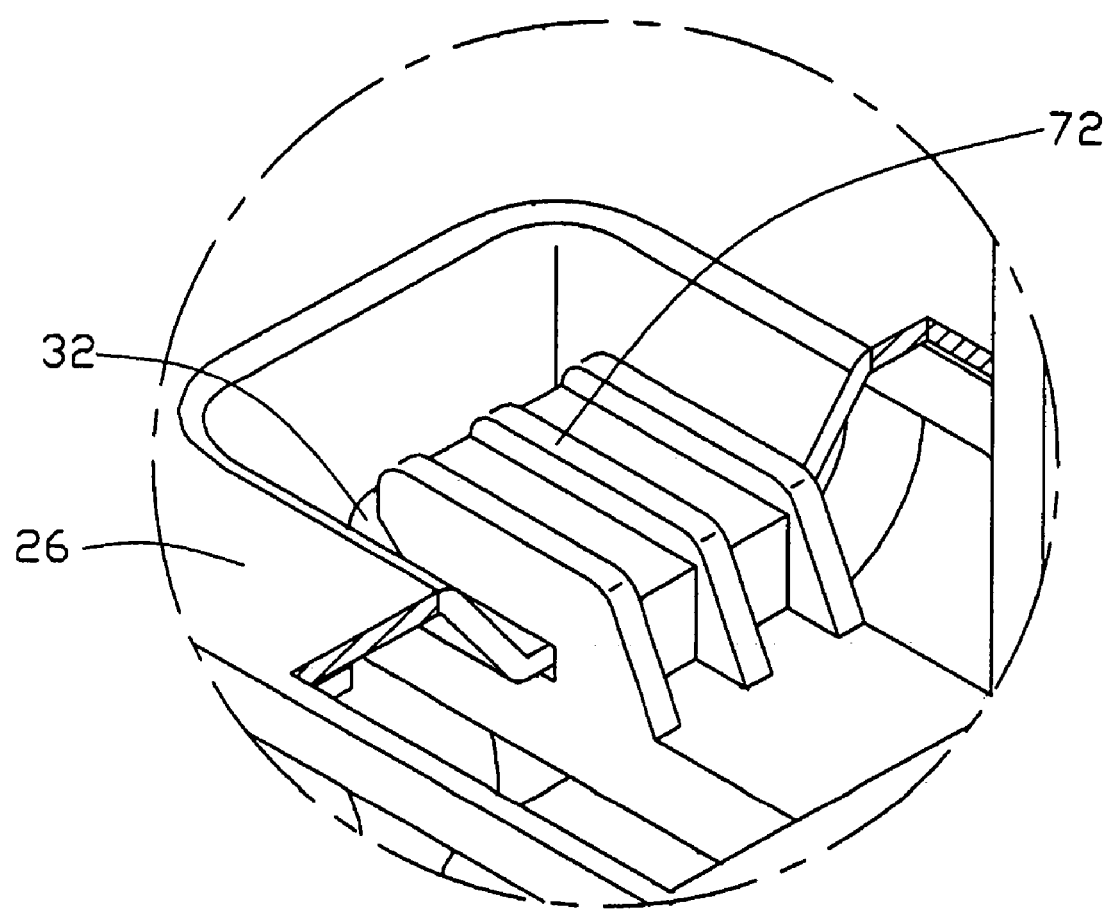
FIG. 4 is an enlarged view of a circled portion IV of FIG. 3.

Referring also to FIG. 2, the mounting frame 60 comprises a bottom wall 62, and a first sidewall 64 and a second sidewall 66 extending upwardly from opposite lateral sides of the bottom wall 62 respectively. A generally U-shaped locking flange 68 is bent outwardly from the first sidewall 64, second sidewall 66 and bottom wall 62, for securing the mounting frame 60 to the side panel 14 of the chassis 10.

The locking flange 68 defines a plurality of spaced third locking holes 70, corresponding to the first locking holes 18 of the side panel 14.

The first sidewall 64 and second sidewall 66 comprise a plurality of spaced, generally L-shaped latches 72 at top ends thereof, corresponding to the catches 32 of the second drive bracket 24 of the chassis 10. Each latch 72 comprises a rib 74 corresponding to the slot 34 of a respective catch 32. The second sidewall 66 comprises a second tab 76 extending from an upper portion thereof distal from the locking flange 68, corresponding to the first tab 36 of the second drive bracket 24. The second tab 76 defines a fourth locking hole 78 therein, corresponding to the second locking hole 38 of the first tab 36.

The first sidewall 64 and second sidewall 66 each define a plurality of parallel recessed channels 80 in inside faces thereof, which serve as rails slidingly receiving the posts 102 of the data storage devices 100 therein. Each channel 80 comprises a stop end 81 near the locking flange 68, and an opposite, slanted guiding end 96. Each channel 80 has a first resilient finger 82 near the guiding end 96, and a second resilient finger 83 near the stop end 81. Each first resilient finger 82 of the first sidewall 64 comprises a generally V-shaped, inwardly projecting first urging portion 86. The first urging portion 86 comprises two slanted sides (not labeled). Each second resilent member 83 of both the first and second sidewalls 64, 66 also comprises a generally V-shaped, inwardly projecting first urging portion 86. Each first resilient finger 82 of the second sidewall 66 comprises a generally wedge-shaped, inwardly projecting second urging portion 88. Each second urging portion 88 comprises a slanted side (not labeled) and a vertical side (not labeled) facing a corresponding first urging portion 86. Each first resilient finger 82 of the second sidewall 66 comprises a pair of horizontally aligned protrusions 90 on an outside face thereof, for securing a respective operational body 92 thereto. The operational body 92 is predrilled in order to engagingly receive the protrusions 90. The operational body 92 comprises a operating portion 94, for being outwardly pulled in order to retract the second urging portion 88 and release a corresponding data storage device 100 retained in corresponding channels 80.

Referring FIGS. 1–4, to secure the mounting frame 60 to the chassis 10, the latches 72 of the mounting frame 60 are engaged in the catches 32 of the second drive bracket 24 of the chassis 10, with the ribs 74 of the latches 72 being received in the slots 34 of the catches 32. The locking flange 68 of the mounting frame 60 abuts against the side panel 14, and the second tab 76 of the mounting frame 60 abuts against the first tab 36 of the second drive bracket 24. The third locking holes 70 of the locking flange 68 are aligned with the first locking holes 18 of the side panel 14, and the fourth locking hole 78 of the second tab 76 is aligned with the second locking hole 38 of the first tab 36. A plurality of fasteners such as screws 98 is extended through the third locking holes 70 and first locking holes 18, and another fastener such as a screw 98 is extended through the fourth locking hole 78 and second locking hole 38. The mounting frame 60 is thereby firmly secured to the chassis 10.

Figure 5:
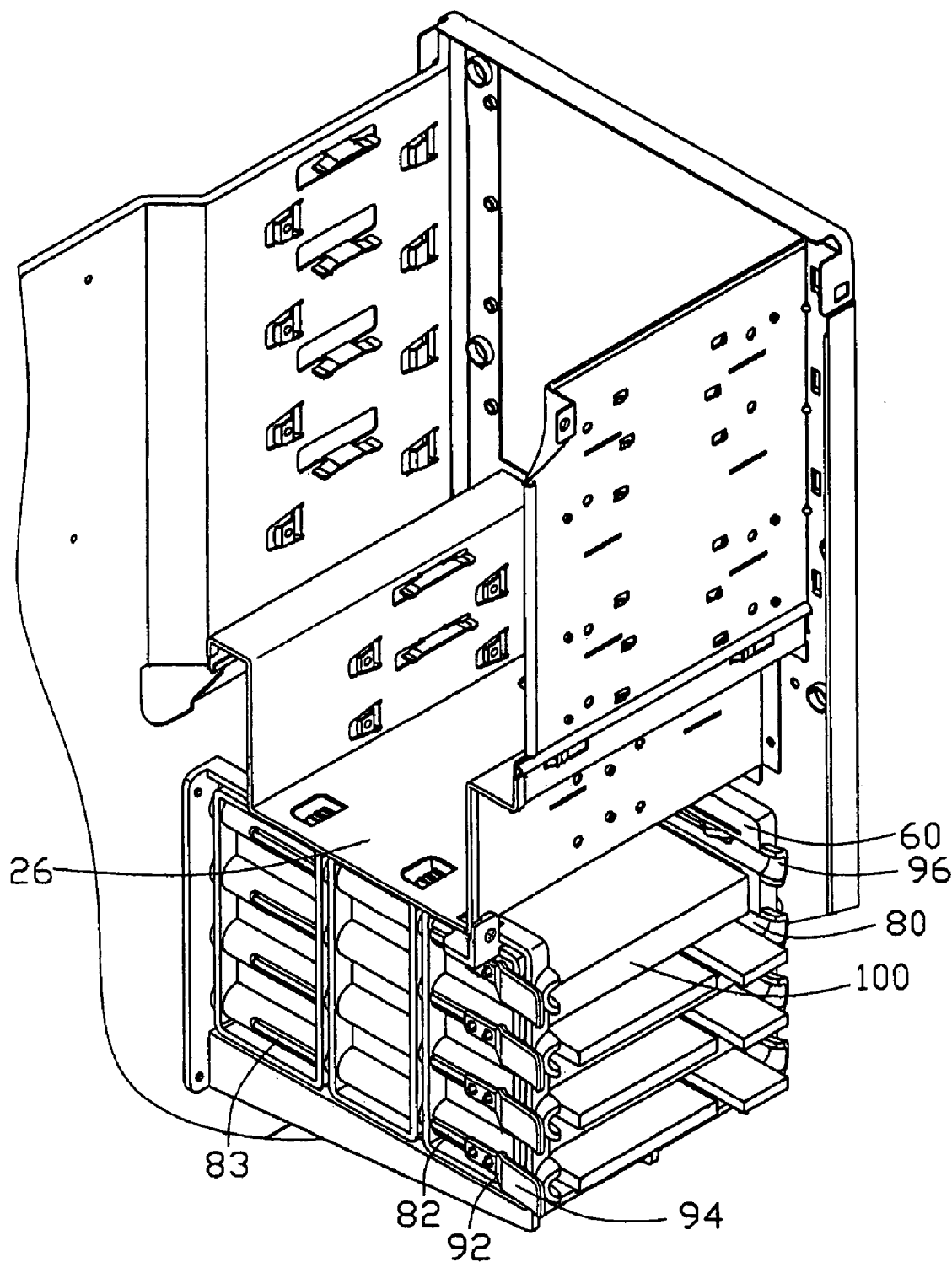
FIG. 5 is an assembled view of FIG. 1.

Referring FIGS. 1, 2 and 5, in order to engage the data storage device 100 in the mounting frame 60, the posts 102 of the data storage device 100 are slid into a pair of selected opposite channels 80 of the mounting frame 60 via corresponding guiding ends 96. A leading pair of the posts 102 rides over the first and second urging portions 86, 88 of the first and second resilient fingers 82, 83, and is stopped at the stop ends 81. Simultaneously, a trailing pair of the posts 102 rides over the second urging portion 88 of the second sidewall 66 and a corresponding opposite one of the first urging portions 86 of the first sidewall 64, respectively. One of the posts 102 of the trailing pair of posts 102 abuts the vertical side of the second urging portion 88. That is, the second urging portion 88 blocks said post 102, and prevents the data storage device 100 from being slid out from the channels 80. The leading pair of the posts 102 is retained between the stop ends 81 and the respective second resilient fingers 82, 83. Thus the data storage device 100 is thus securely received in the mounting frame 60.

To remove the data storage device 100 from the mounting frame 60, the operating portion 94 of the operational body 92 is pulled outwardly, and the second urging portion 88 retracts and no longer stop blocks said post 102. The data storage device 100 is then easily slid out from the channels 80.

Figure 6:
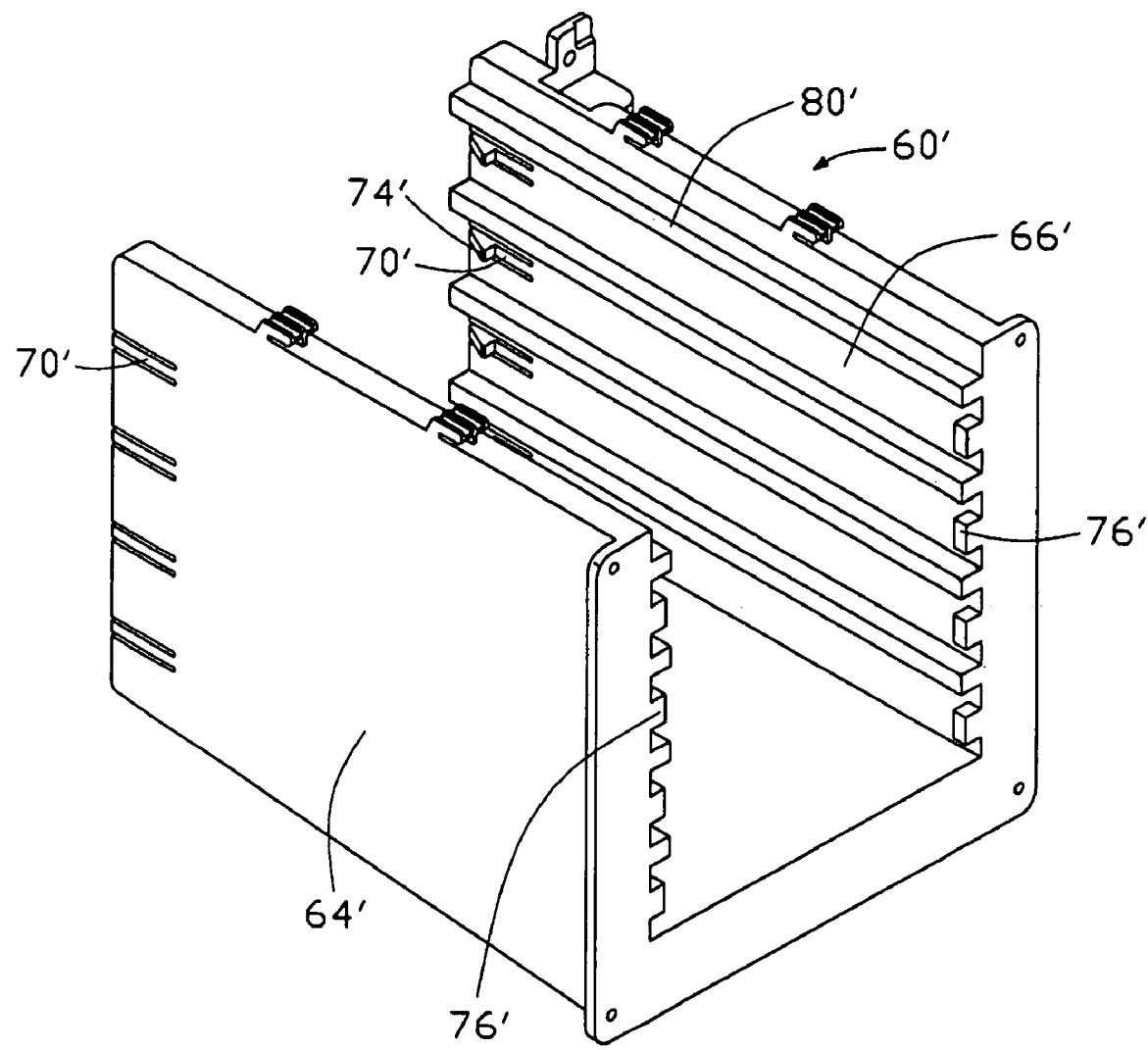
FIG. 6 is an isometric view of a mounting frame of a mounting apparatus for data storage devices in accordance with an alternative embodiment of the present invention.

Referring to FIG. 6, a mounting frame 60' in accordance with an alternative embodiment of the present invention is similar to the mounting frame 60 of the mounting apparatus of the preferred embodiment of the present invention, except for the following. A generally U-shaped locking flange 68' is provided at one end of the mounting frame 60'. A plurality of spaced, parallel horizontal bars 80' is formed on inside faces of a first sidewall 64' and a second sidewall 66'. Each pair of directly opposite bars 80' on the first and second sidewalls 64', 66' serves as a pair of supporting rails for the posts 102 of any data storage device 100 to slide therealong. That is, a pair of channels (not labeled) is cooperatively defined by the first and second sidewalls 64', 66' and each said pair of bars 80'. A pair of stop blocks 76' is formed on the inside faces of the first and second sidewalls 64', 66' above each said pair of bars 80', for stopping the leading posts 102 of a corresponding data storage device 100. A resilient finger 70' is formed on the inside faces of the first and second sidewalls 64', 66' above each said pair of bars 80', at ends of the first and second sidewalls 64', 66' distal from the stop blocks 76'. Each resilient finger 70' of the first sidewall 64' comprises an urging portion (not visible), similar to the first urging portion 86 of the mounting frame 60 of the preferred embodiment. Each resilient finger 70' of the second sidewall 66' comprises an urging portion 74', similar to the second urging portion 88 of the mounting frame 60 of the preferred embodiment. Each resilient finger 70' of the second sidewall 66' also comprises an operational body (not visible), similar to any of the operational bodies 92 of the mounting frame 60 of the preferred embodiment.

Assembly of the mounting frame 60' to the chassis 10 is substantially the same as that described above in relation to the mounting frame 60 of the mounting apparatus of the preferred embodiment. Engagement of any data storage device 100 in the mounting frame 60' is substantially the same as that described above in relation to the mounting frame 60.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A mounting apparatus comprising:
   a chassis;
   a data storage device comprising a pair of posts on each of the opposite sides thereof; and
   a mounting frame secured to the chassis and slidingly receiving the data storage device therein, the mounting frame comprising a bottom wall, and two sidewalls extending from opposite sides of the bottom wall, a pair of channels defined in the sidewalls respectively for receiving the posts of the data storage device, each of the channels forming a stop end and an inwardly projecting resilient member spacing from the stop end; wherein the resilient member of one of the channels has a slanted portion and a vertical portion, and when a corresponding post of the data storage device rides over the slanted portion, the vertical portion stops said post from escaping from said one channel, whereby the data storage device is retained in the mounting frame;

wherein the chassis comprises a drive bracket, the drive bracket comprises a bottom plate and two lateral plates extending from opposite sides of the bottom plate, and the mounting frame is secured to the bottom plate of the drive bracket;

wherein the bottom plate of the drive bracket comprises a plurality of spaced catches, and each of the catches defines a slot in a bottom thereof;

wherein a plurality of spaced, generally L-shaped latches is arranged at top ends of the sidewalls of the mounting frame, each of the latches comprises a rib, and said latches engage in the catches of the drive bracket and said ribs are received in the slots of respective catches, whereby the mounting frame is secured to the bottom plate of the drive bracket;

wherein the chassis comprises a front panel and a side panel, and the side panel defines a plurality of first locking holes;

wherein a generally U-shaped locking flange is bent outwardly from the first sidewall, second sidewall and bottom wall of the mounting frame, the locking flange defines a plurality of second locking holes, the locking flange abuts the side panel of the chassis, the second locking holes of the locking flange are aligned with the first locking holes of the side panel, a plurality of fasteners extends through the first locking holes and the second locking holes in order to secure the mounting frame to the side panel.

2. The mounting apparatus as claimed in claim 1, wherein a first tab extends downwardly from a rearmost portion of one of the lateral plates of the drive bracket, the first tab defines a third hole, a second tab extends from an upper portion of one of the sidewalls of the mounting frame distal from the locking flange, the second tab defines a fourth hole, and a fastener extends through the third hole and the fourth hole for securing the mounting frame to the drive bracket.

* * * * *